R. H. Gordon,
Hoe & Garden Rake Combined.
Potato Digger.

73525

PATENTED JAN 21 1868

Inventor.
R. H. Gordon

Witnesses.

United States Patent Office.

R. H. GORDON, SR., OF BROOKLYN, OHIO.

Letters Patent No. 73,525, dated January 21, 1868.

IMPROVEMENT IN HOE AND GARDEN-RAKE COMBINED.

The Schedule referred to in these Letters Patent and making part of the same.

TO ALL WHOM IT MAY CONCERN:

Be it known that I. R. H. GORDON, Sr., of Brooklyn, in the county of Cuyahoga, and State of Ohio, have invented certain new and useful Improvements in Hoe and Garden-Rake Combined, and Potato-Digger; and I do hereby declare that the following is a full and complete description of the same, reference being had to the accompanying drawing making a part of this specification, in which—

Figure 1:
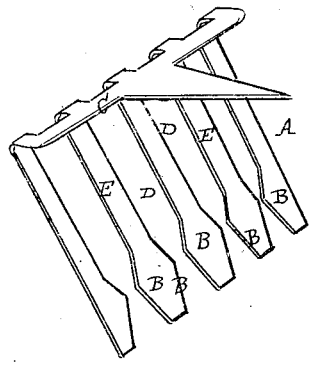
Figure 2:
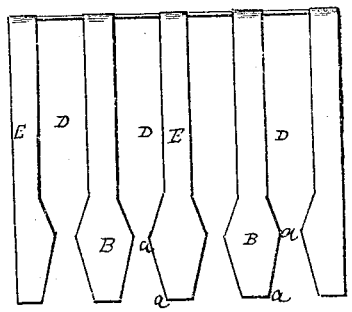

Figure 1 is a perspective view.
Figure 2 is a rear view.
Like letters of reference refer to like parts in the views.

This implement is constructed of the form shown in fig. 1, and can be used either as a hoe, rake, or potato-digger.

A are the teeth, which consist of the shanks E and flukes B, the shanks being curved round, and form a part of or are secured to the head C, to which the handle is connected in the ordinary way, the cutting-edge of the teeth being formed on the end and sides of the flukes. These teeth are enlarged or widened, as shown, from the point $a$ to $a'$, and then decrease or narrow down to the shank, thus leaving a space, D, in the rear of the flukes, large enough for small weeds, &c., to drop through, so as not to clog the rake, as hereafter described.

When this rake is used for weeding, the end of the teeth is used for cutting them up, the side of the flukes cutting the larger ones, or they can be taken and compressed between the flukes where the space contracts, thus preventing the weeds from passing beyond the flukes, and drawing them up from the ground bodily, and any dirt or weeds resting on the shanks can be thrown or shaken off with the weeds pulled up, as described.

In digging potatoes, the small ones can be lifted on the end of the teeth, which will pass the flukes and drop through the space D, the same as the weeds before referred to, the larger ones resting between the shanks of the teeth, which can then be thrown off.

What I claim as my improvement, and desire to secure by Letters Patent, is—

A combined hoe and rake, constructed with flukes B, enlarged or widened at the point $a'$, and provided with the shanks E, in the manner as and for the purpose specified.

R. H. GORDON, Sr.

Witnesses:
W. H. BURRIDGE,
J. HOLMES.